(12) United States Patent
Gandhi et al.

(10) Patent No.: US 11,777,935 B2
(45) Date of Patent: Oct. 3, 2023

(54) EXTENDING SECONDARY AUTHENTICATION FOR FAST ROAMING BETWEEN SERVICE PROVIDER AND ENTERPRISE NETWORK

(71) Applicant: Cisco Technology, Inc., San Jose, CA (US)

(72) Inventors: Indermeet Singh Gandhi, San Jose, CA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 197 days.

(21) Appl. No.: 16/743,630

(22) Filed: Jan. 15, 2020

(65) Prior Publication Data

US 2021/0218744 A1 Jul. 15, 2021

(51) Int. Cl.
*H04L 29/06* (2006.01)
*H04L 9/40* (2022.01)

(52) U.S. Cl.
CPC ........ *H04L 63/0892* (2013.01); *H04L 63/062* (2013.01); *H04L 63/0876* (2013.01); *H04L 63/18* (2013.01)

(58) Field of Classification Search
CPC ............... H04L 63/0892; H04L 63/062; H04L 63/0876; H04L 63/18
See application file for complete search history.

(56) References Cited

U.S. PATENT DOCUMENTS

| 7,788,492 | B2 | 8/2010 | Cam Winget |
| 7,873,352 | B2 | 1/2011 | Nguyen et al. |
| 8,023,484 | B1 | 9/2011 | Huang et al. |
| 8,036,222 | B1 | 10/2011 | Huang et al. |

(Continued)

FOREIGN PATENT DOCUMENTS

| CA | 2 546 543 A1 | 11/2006 |
| EP | 1672945 A1 | 6/2006 |

(Continued)

OTHER PUBLICATIONS

3GPP, "3rd Generation Partnership Project; Technical Specification Group Services and System Aspects; Security architecture and procedures for 5G system (Release 16)," 3GPP TS 33.501 V16.4.0, Sep. 2020, 250 pages.

(Continued)

*Primary Examiner* — Phy Anh T Vu
(74) *Attorney, Agent, or Firm* — Edell, Shapiro & Finnan, LLC

(57) ABSTRACT

Methods are provided for generating an enterprise key for access to an enterprise network via another access network, as part of a secondary authentication to an external data network through another access network. In these methods, an enterprise authentication device obtains, via a first access network, a request to authenticate a user device onto an enterprise network. The user device is connected to the first access network. The method further includes the enterprise authentication device authenticating the user device to obtain access to the enterprise network via the first access (Continued)

network and generating the enterprise key for the user device to provide access to the enterprise network via a second access network.

23 Claims, 6 Drawing Sheets

(56) References Cited

U.S. PATENT DOCUMENTS

| | | | |
|---|---|---|---|
| 8,559,392 | B2 | 10/2013 | Ramankutty et al. |
| 8,725,138 | B2 | 5/2014 | Lee et al. |
| 8,959,598 | B2 | 2/2015 | Smith |
| 9,264,900 | B2 | 2/2016 | Sun et al. |
| 9,699,601 | B2 | 7/2017 | Grayson et al. |
| 9,826,401 | B2 * | 11/2017 | Carames ............... H04W 8/02 |
| 10,015,713 | B2 * | 7/2018 | Hedberg ............ H04W 12/062 |
| 10,039,151 | B1 * | 7/2018 | Upp .................... H04W 12/069 |
| 10,080,097 | B2 | 9/2018 | Grayson et al. |
| 10,165,608 | B2 | 12/2018 | Grayson et al. |
| 10,257,753 | B2 | 4/2019 | Sirotkin et al. |
| 10,432,463 | B2 | 10/2019 | Likar |
| 10,750,366 | B1 * | 8/2020 | Gundavelli ......... H04W 12/069 |
| 10,785,652 | B1 | 9/2020 | Ravindranath et al. |
| 11,070,974 | B2 | 7/2021 | Dodd-Noble et al. |
| 11,108,773 | B1 * | 8/2021 | Dhani Reddy ..... H04L 63/0272 |
| 2003/0069030 | A1 | 4/2003 | Mukherjee |
| 2004/0242228 | A1 | 12/2004 | Lee et al. |
| 2007/0064647 | A1 | 3/2007 | Prasad |
| 2007/0110009 | A1 | 5/2007 | Bachmann et al. |
| 2007/0206537 | A1 | 9/2007 | Cam-Winget et al. |
| 2010/0002626 | A1 | 1/2010 | Schmidt et al. |
| 2010/0035578 | A1 * | 2/2010 | Ahmed ............... H04W 12/068 455/411 |
| 2010/0199332 | A1 * | 8/2010 | Bachmann ............ H04L 63/164 370/252 |
| 2013/0176897 | A1 * | 7/2013 | Wang .................... H04W 12/50 370/254 |
| 2013/0305332 | A1 | 11/2013 | Narasimhan |
| 2013/0336210 | A1 | 12/2013 | Connor et al. |
| 2014/0050320 | A1 * | 2/2014 | Choyi .................. H04W 12/06 380/270 |
| 2014/0328193 | A1 | 11/2014 | Horn et al. |
| 2016/0066234 | A1 | 3/2016 | Cho et al. |
| 2016/0112869 | A1 | 4/2016 | Lee et al. |
| 2016/0127897 | A1 | 5/2016 | Lee et al. |
| 2016/0127903 | A1 | 5/2016 | Lee et al. |
| 2016/0373992 | A1 | 12/2016 | Jung et al. |
| 2017/0078874 | A1 | 3/2017 | Lee et al. |
| 2017/0134940 | A1 | 5/2017 | Sharma et al. |
| 2017/0223531 | A1 | 8/2017 | Mestanov et al. |
| 2017/0230826 | A1 | 8/2017 | Mestanov et al. |
| 2017/0353983 | A1 * | 12/2017 | Grayson ............... H04W 12/06 |
| 2018/0020383 | A1 | 1/2018 | Sirotkin et al. |
| 2018/0041930 | A1 * | 2/2018 | Hampel ................ H04W 76/11 |
| 2018/0145982 | A1 * | 5/2018 | Wang .................... H04W 88/16 |
| 2018/0184297 | A1 * | 6/2018 | Mohamed ......... H04W 36/0038 |
| 2018/0184345 | A1 | 6/2018 | Likar et al. |
| 2018/0206117 | A1 | 7/2018 | Stahl |
| 2018/0262978 | A1 * | 9/2018 | Kahn .................... H04W 48/20 |
| 2018/0332442 | A1 * | 11/2018 | Shaw .................... H04W 36/26 |
| 2018/0352490 | A1 * | 12/2018 | Hu ........................ H04W 36/14 |
| 2019/0007376 | A1 | 1/2019 | Norrman et al. |
| 2019/0037390 | A1 | 1/2019 | Hooda et al. |
| 2019/0037613 | A1 | 1/2019 | Anantharaman et al. |
| 2019/0053049 | A1 | 2/2019 | Kunz et al. |
| 2019/0230510 | A1 | 7/2019 | Ben Henda et al. |
| 2019/0253407 | A1 | 8/2019 | Livanos et al. |
| 2019/0268759 | A1 | 8/2019 | Targali |
| 2019/0313318 | A1 | 10/2019 | Pawar et al. |
| 2020/0153871 | A1 | 5/2020 | Lei et al. |
| 2020/0162889 | A1 | 5/2020 | Desai et al. |
| 2020/0204984 | A1 | 6/2020 | Dodd-Noble et al. |
| 2021/0084493 | A1 | 3/2021 | Naribole et al. |
| 2021/0105632 | A1 | 4/2021 | Pazyhannur et al. |
| 2021/0124850 | A1 | 4/2021 | Gundavelli et al. |
| 2021/0185506 | A1 | 6/2021 | Gundavelli et al. |
| 2021/0195399 | A1 | 6/2021 | Li et al. |
| 2021/0218744 | A1 | 7/2021 | Gandhi et al. |
| 2021/0281445 | A1 | 9/2021 | Trim et al. |
| 2021/0385742 | A1 | 12/2021 | Liao |
| 2022/0330008 | A1 | 10/2022 | Balasubramanian |

FOREIGN PATENT DOCUMENTS

| | | |
|---|---|---|
| EP | 3494727 B1 | 5/2020 |
| WO | 2009008627 A2 | 1/2009 |
| WO | 2018026551 A1 | 2/2018 |

OTHER PUBLICATIONS

CableLabs, "A Comparative Introduction to 4G and 5G Authentication," https://www.cablelabs.com/insights/a-comparative-introduction-to-4g-and-5g-authentication, Feb. 2019, 19 pages.

ETSI, "LTE; Evolved Universal Terrestrial Radio Access (E-UTRA); Radio Resource Control (RRC); Protocol specification (3GPP TS 36.331 version 15.3.0 Release 15)," ETSI TS 136 331 V15.3.0, Oct. 2018, pp. 604-607.

Cisco, "802.11r Fast Transition Roaming," 802.11r, 802.11k, and 802.11w Deployment Guide, Cisco IOS-XE Release 3.3, Jul. 2015, 8 pages.

Simon, et al., "The EAP-TLS Authentication Protocol," Network Working Group, Request for Comments: 5216, Standards Track, Mar. 2008, 34 pages.

Aboba, et al., "Extensible Authentication Protocol (EAP) Key Management Framework," Network Working Group, Request for Comments: 5247, Standards Track, Aug. 2008, 79 pages.

Funk, et al., "Extensible Authentication Protocol Tunneled Transport Layer Security Authenticated Protocol Version 0 (EAP-TTLSv0)," Network Working Group, Request for Comments: 5281, Informational, Aug. 2008, 51 pages.

Kaufman, et al., "Internet Key Exchange Protocol Version 2 (IKEv2)," Internet Engineering Task Force (IETF), Request for Comments: 7296, Standards Track, Oct. 2014, 142 pages.

IEEE, "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 2: Fast Basic Service Set (BSS) Transition", LAN/MAN Standards Committee of the IEEE Computer Society, May 9, 2008, 126 pages.

ETSI, "Digital cellular telecommunications system (Phase 2+) (GSM); Universal Mobile Telecommunications System (UMTS); LTE; 3GPP System Architecture Evolution (SAE); Security aspects of non-3GPP accesses (3GPP TS 33.402 version 14.2.0 Release 14)", ETSI TS 133 402 V14.2.0, Jul. 2017, 72 pages.

B. Aboba et al., "Extensible Authentication Protocol (EAP)", Network Working Group, Request for Comments: 3748, Obsoletes: 2284, Category: Standards Track, Jun. 2004, 67 pages.

P. Eronen, Ed. et al., "Diameter Extensible Authentication Protocol (EAP) Application", Network Working Group, Request for Comments: 4072, Category: Standards Track, Aug. 2005, 33 pages.

J. Arkko et al., "Extensible Authentication Protocol Method for 3rd Generation Authentication and Key Agreement (EAP-AKA)", Network Working Group, Request for Comments: 4187, Category: Informational, Jan. 2006, 79 pages.

J. Arkko et al., "Improved Extensible Authentication Protocol Method for 3rd Generation Authentication and Key Agreement (EAP-AKA')", Network Working Group, Request for Comments: 5448, Updates: 4187, Category: Informational, May 2009, 29 pages.

3GPP, "3rd Generation Partnership Project; Technical Specification Group Services and System Aspects; Security architecture and procedures for 5G system (Release 16)", 3GPP TS 33.501 V16.2.0, Mar. 2020, 227 pages.

3GPP, "3rd Generation Partnership Project; Technical Specification Group Core Network and Terminals; 5G System; Session Management Services; Stage 3 (Release 16)", 3GPP TS 29.502 V16.4.0, Jul. 2020, 256 pages.

(56) References Cited

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.1.1, Jun. 2019, 549 pages.

3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, 549 pages.

ETSI, "5G; Security architecture and procedures for 5G System (3GPP TS 33.501 version 15.1.0 Release 15)", ETSI TS 133 501 V15.1.0, Jul. 2018, 150 pages.

B. Aboba, "Extensible Authentication Protocol (EAP)", Network Working Group, Request for Comments: 3748, Obsoletes: 2284, Category: Standards Track, Jun. 2004, 67 pages.

ETSI, "LTE; Evolved Universal Terrestrial Radio Access (E-UTRA); Radio Resource Control (RRC); Protocol specification (3GPP TS 36.331 version 15.3.0 Release 15)," ETSI TS 136 331 V15.3.0, Oct. 2018, pp. 230-239.

ETSI, "Universal Mobile Telecommunications System (UMTS); LTE; Access to the 3GPP Evolved Packet Core (EPC) via non-3GPP access networks; Stage 3 (3GPP TS 24.302 version 15.3.0 Release 15)," ETSI TS 124 302 V15.3.0, Jun. 2018, 171 pages.

3GPP, "3rd Generation Partnership Project; Technical Specification Group Radio Access Network; Evolved Universal Terrestrial Radio Access (E-UTRA); User Equipment (UE) procedures in idle mode (Release 16)," TS 36.304 V16.1.0, Jul. 2020, 63 pages.

3GPP, "3rd Generation Partnership Project; Technical Specification Group Core Network and Terminals; Access Network Discovery and Selection Function (ANDSF) Management Object (MO) (Release 16)," TS 24.312 V16.0.0, Jul. 2020, 394 pages.

Johnson, et al., "dLTE: Buliding a more Wifi-like Cellular Network," Proceedings of the 17th ACM Workshop on Hot Topics in Networks, Nov. 2018, 7 pages.

Tabassam, et al., "Fast and Seamless Handover for Secure Mobile Industrial Applications with 802.11r," The 5th IEEE International Workshop on Performance and Management of Wireless and Mobile Networks (P2MNET 2009), Oct. 2009, 8 pages.

Elsadek, et al., "Inter-Domain Mobility Management using SDN For Residential/Enterprise Real Time Services," 2016 4th International Conference on Future Internet of Things and Cloud Workshops, Aug. 2016, 8 pages.

Prados-Garzon, et al., "5G Non-Public Networks: Standardization, Architectures and Challenges," IEEE Access, vol. 9, Nov. 2021, 16 pages.

* cited by examiner

400

```
┌─────────────────────────────────────────────────────────────┐  402
│  NETWORK DEVICE OBTAINS, VIA A FIRST ACCESS NETWORK, A      │
│  REQUEST TO AUTHENTICATE A USER DEVICE TO ESTABLISH         │
│  ANOTHER SESSION WITH AN ENTERPRISE NETWORK, THE REQUEST    │
│  INCLUDES AN IDENTIFIER OF AN ENTERPRISE AUTHENTICATION     │
│  DEVICE THAT STORES AN ENTERPRISE KEY FOR AN ESTABLISHED    │
│  SESSION OF THE USER DEVICE WITH THE ENTERPRISE NETWORK     │
│  PROVIDED VIA A SECOND ACCESS NETWORK                       │
└─────────────────────────────────────────────────────────────┘
                             │
                             ▼
┌─────────────────────────────────────────────────────────────┐  404
│  NETWORK DEVICE OBTAINS, FROM THE ENTERPRISE AUTHENTICATION │
│  DEVICE, THE ENTERPRISE KEY BASED ON THE ENTERPRISE         │
│  AUTHENTICATION DEVICE CORRELATING AN IDENTITY OF THE FIRST │
│  ACCESS NETWORK WITH AN IDENTIFIER OF THE ESTABLISHED       │
│  SESSION WITH THE ENTERPRISE NETWORK VIA THE SECOND         │
│  ACCESS NETWORK                                             │
└─────────────────────────────────────────────────────────────┘
                             │
                             ▼
┌─────────────────────────────────────────────────────────────┐  406
│  NETWORK DEVICE ESTABLISHES, VIA THE FIRST ACCESS NETWORK,  │
│  THE ANOTHER SESSION WITH THE ENTERPRISE NETWORK BASED ON   │
│  THE ENTERPRISE KEY                                         │
└─────────────────────────────────────────────────────────────┘
```

FIG.4

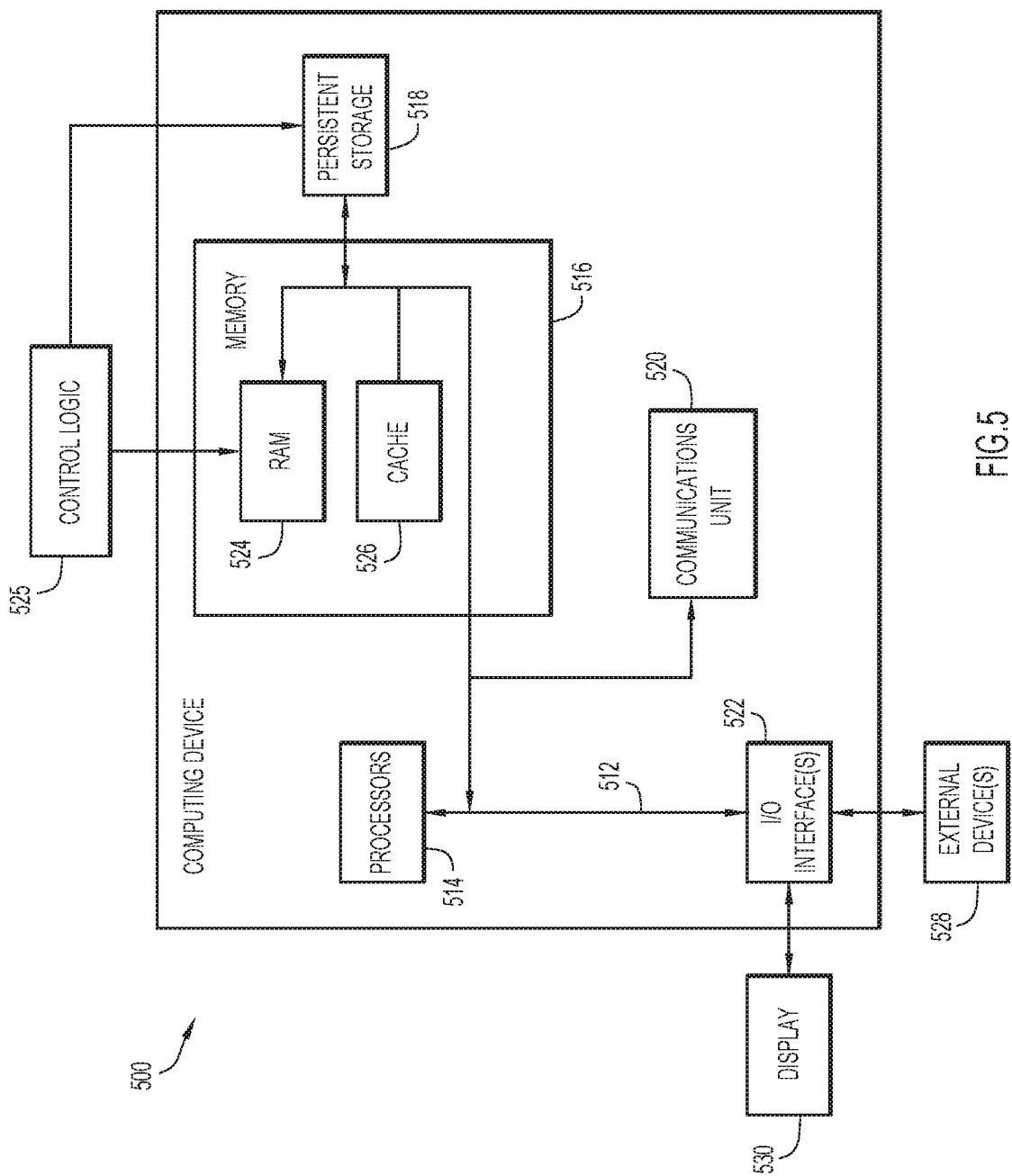

EXTENDING SECONDARY AUTHENTICATION FOR FAST ROAMING BETWEEN SERVICE PROVIDER AND ENTERPRISE NETWORK

TECHNICAL FIELD

The present disclosure relates to interworking between various communication technology architectures.

BACKGROUND

Networking architectures have grown increasingly complex in communications environments, particularly mobile networking environments. Mobile communication networks have grown substantially as end users have become increasingly connected to mobile network environments. As the number of mobile users increases, efficient management of communication resources becomes more critical. In particular, there are significant challenges in managing network authentication for architectures involving multiple access types.

BRIEF DESCRIPTION OF THE DRAWINGS

FIG. 4 is a flowchart illustrating a method of fast roaming into an enterprise network via another access network based on an enterprise key, according to an example embodiment.

FIG. 5 is a hardware block diagram of a computing device configured to provide fast roaming between different access technologies, according to various example embodiments.

DESCRIPTION OF EXAMPLE EMBODIMENTS

Overview

Figure 1:
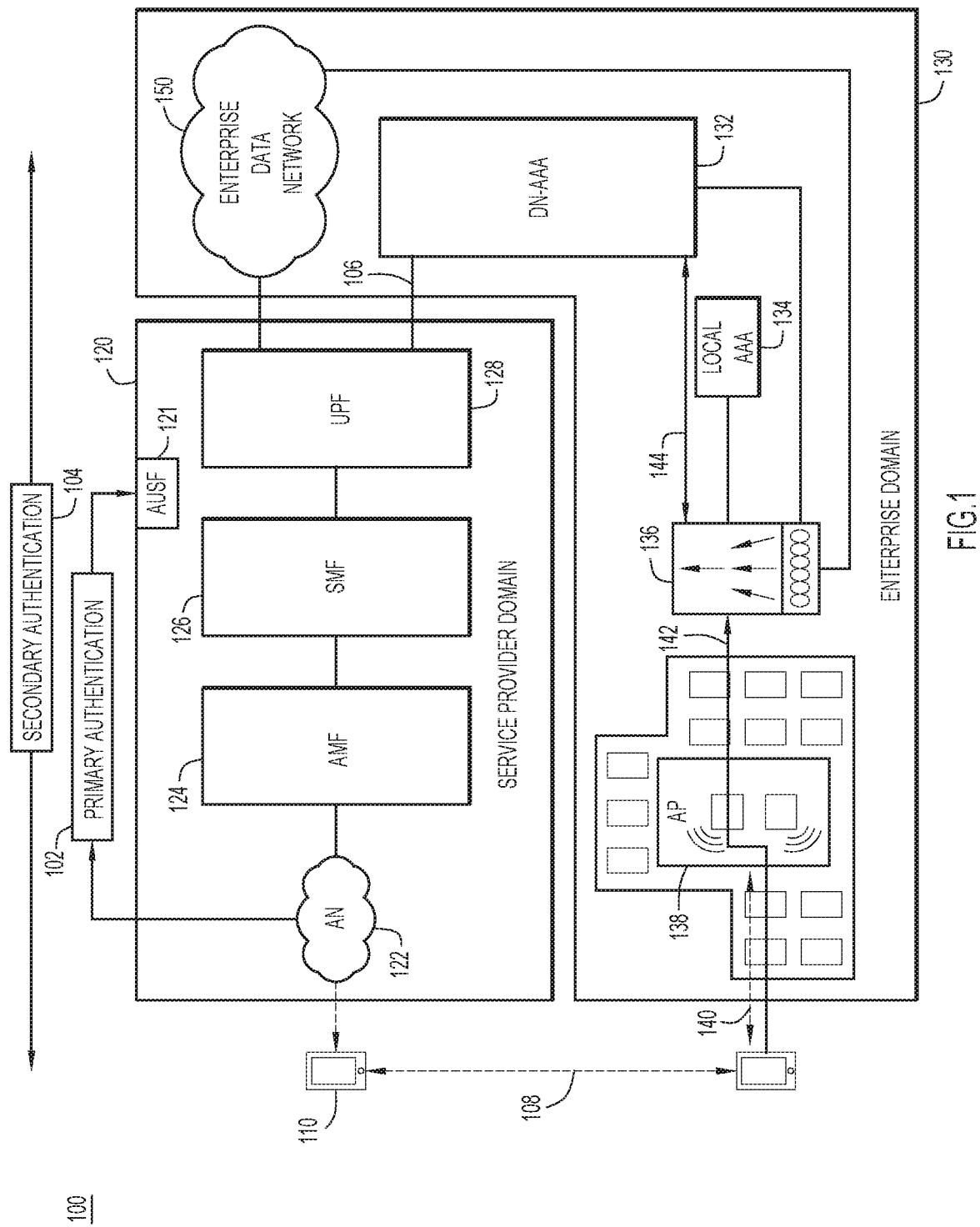
FIG. 1 is a block diagram illustrating an environment in which fast roaming is enabled between different access networks, according to an example embodiment.

Briefly, methods for generating an enterprise key during an authentication are provided. The enterprise key allows for fast roaming into the enterprise network via another access network. In these methods, an enterprise authentication device obtains, via a first access network, a request to authenticate a user device onto an enterprise network. The user device is connected to the first access network. The enterprise authentication device also authenticates the user device to obtain access to the enterprise network via the first access network and generates the enterprise key for the user device to provide access to the enterprise network via a second access network.

Additionally, methods for fast roaming into an enterprise network via another access network are provided. In these methods, a network device obtains, via a first access network, a request to authenticate a user device to establish a session with an enterprise network. The request includes an identifier of an enterprise authentication device that stores an enterprise key for an existing session of the user device with the enterprise network provided via a second access network. The network device also obtains, from the enterprise authentication device, the enterprise key based on the enterprise authentication device verifying an identity of the first access network with a session identifier of the user device and establishes, via the first access network, another session with the enterprise network based on the enterprise key.

EXAMPLE EMBODIMENTS

Mobile communication networks provide data and voice services to their subscribers. A subscriber registers with a mobile communication network and performs primary authentication to establish a connection with the mobile communication network. Once the connection with the mobile communication network is established, the subscriber is seamlessly switched from one access point to another within the mobile communication network without any further authentication, thus allowing for fast roaming within the mobile communication network.

A number of the subscribers of the mobile communication network may also be enterprise users that use the mobile communication network to gain access to a third party domain e.g., services offered by an enterprise network. Mobile network operators (MNOs) provide their subscribers with access to the third party domain based on additional authentication i.e., secondary authentication. That is, when the user attaches to the mobile communication network, there is a primary authentication using service provider (SP) identity credentials. Next, to gain access to the third party domain, a secondary authentication can be performed using an enterprise identity and this enterprise identity is verified at the enterprise authentication function, though the user is attached to the mobile communication network. In this mode, the enterprise network is an external data network that handles secondary authentication and provides services to the authenticated enterprise users. The mobile communication network just handles the primary authentication and then becomes just an access network for the external data network (the enterprise network). The user may switch from the mobile communication network to another access network such as another mobile communication network or a wireless local access network (WLAN) of the enterprise network to continue using the data network. The user then performs another authentication to access the enterprise network via the WLAN network. When the user roams to the enterprise network via a different access network, a new authentication is to be performed using the enterprise identity. That is, while fast roaming is available for the network connectivity within the mobile communication network, the user may need to perform one or more authentications again over a second access network though it has completed secondary authentication over the first access network, which may be inconvenient and timely. According to one or more example embodiments, fast roaming is enabled for access to an enterprise network via different access networks, as detailed below.

As noted above, the MNOs provide voice and data services to authenticated user equipment (UE). Some of the services offered by the MNOs may be segmented for various enterprises, for example, to provide enterprise specific network slices. Segmented services may be services offered by various third parties such as applications and/or enterprise domains. For example, an enterprise A may have a network slice A in the MNO domain and an enterprise B may have its own network slice B in the MNO domain. According to one or more example embodiments, one or more enterprises may have multiple network slices for various enterprise services such as the enterprise A may have a first network slice for voice over IP (VoIP) services, a second network slice may for data services, and a third network slice for a limited guest access to data services. This description is provided by way of an example only and not by way of a limitation.

Access to various enterprise services are enabled through these network slices provided or hosted by the MNO, also sometimes referred to as a service provider (SP) or MNO/SP. To gain access to one or more of these network slices, the UE may perform an additional or secondary, authentication. The secondary authentication may be enabled based on a policy for a particular network slice. If authenticated, the enterprise network then becomes an external data network for a $3^{rd}$ Generation Partnership Project (3GPP) network providing services to the UE. When a relationship between the enterprise and the NINO is established and when the secondary authentication is being performed on a protocol data unit (PDU) session, the secondary authentication may be extended for other purposes, as explained in greater detail below, according to various example embodiments. For example, techniques of various example embodiments support fast roaming for the UE between an NINO network and another enterprise access network such as a WLAN network (e.g., Wi-Fi network), by leveraging the 3GPP secondary authentication mode.

Techniques presented herein may allow an enterprise network deployment involving multi-access technologies to eliminate separate authentications for each access technology to allow fast roaming across various access technologies into the enterprise network. These access networks may include but are not limited to wired, wireless local area network (e.g., Wi-Fi®), and/or private cellular (e.g., private 3rd Generation Partnership Project (3GPP) 4th Generation (4G)/Long Term Evolution (LTE), 5th Generation (5G), Citizen Broadband Radio Service (CBRS), etc.) access networks. In one example embodiment, authentication into the enterprise network may be performed by a global authentication, authorization, and accounting (AAA) function(s) that can manage access into an enterprise network for various access networks (e.g., wired, wireless local area network (WLAN), cellular, etc.).

As referred to herein, the terms 'access', 'access type', and variations thereof that may be used with reference to access networks may refer to wired accesses/access types (e.g., Ethernet) and wireless accesses/access types (e.g., over-the-air Radio Frequency (RF) accesses also sometimes referred to as Radio Access Technology (RAT) types such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, New Radio (NR), and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); CBRS accesses; combinations thereof; and/or the like.

In at least one deployment, these techniques reduce handover latency for a UE that has already completed secondary authentication on the network, and later roams into a Wi-Fi network operated by the enterprise. Subsequent authentication to the enterprise Wi-Fi network can be seen as a Fast Roaming event, as opposed to a complete new authentication e.g., an initial authentication that would require a complete message exchange and key generation. A global AAA function(s) may be deployed as a common anchor point for the secondary authentication to the enterprise network through a first access network (the MNO network) and through the second access network (the enterprise Wi-Fi network). The secondary authentication is optimized by, having the global AAA function provide the authentication information (including an enterprise key) to the UE and provide authentication information to the second access network as well, thus reducing the time required to complete access to the enterprise network through the second access network when the user roams into that network.

In at least one implementation, the secondary authentication between the UE and an external data network is based at least in part on an Extensible Authentication Protocol (EAP) framework specified in a Request for Comments (RFC) § 3748 and secondary authentication techniques described in 3GPP Technical Specifications (TS) § 33.501. In various example embodiments, different EAP based authentication methods and associated credentials may be used.

FIG. 1 is a block diagram illustrating an environment 100 in which fast roaming to an external data network is enabled between different access networks, according to an example embodiment. In FIG. 1, the environment 100 may include a device or the UE 110, a service provider domain 120, an enterprise domain 130, which may provide an enterprise data network (DN) 150.

The UE 110 may be, but is not limited to, a mobile device, a mobile terminal or station, an internet of things (IoT) device, a consumer device such as a personal digital assistant (PDA) or a smart phone, a personal computer such as a notebook or a desktop computer. The IoT device may include communication equipment, smart appliances, commercial security systems, industrial systems, and so on. While only one UE 110 is depicted in FIG. 1, one of ordinary skill in the art would readily appreciate that different numbers of UEs may be present in the environment 100 depending on a particular configuration.

The UE 110 is connected to a service provider domain 120 via a primary authentication 102, detailed below. The service provider domain 120 may include any mobile communication network such as 4G/LTE networks and/or 5G cellular public or private networks. In FIG. 1, the service provider domain 120 is a 5G network. The service provider domain 120 includes an Authentication Service Function (AUSF) 121 and an access network (AN) 122 such as an access point, evolved or next generation NodeB, or a base station. The service provider domain 120 further includes an Access and Mobility Management Function (AMF) 124, a Session Management Function (SMF) 126, and a User Plane Function (UPF) 128. Generally, the AMF 124 may provide functionality similar to that of a Mobility Management Entity (MME) of the 4G/LTE networks and is responsible for handling connections and mobility management tasks. The SMF 126 is responsible for handling session management. The SMF 126 interacts with a decoupled data plane, creating updates and removing Protocol Data Unit (PDU) sessions, and managing session context with the UPF 128. The UPF 128 is an interconnection point between the service provider domain 120 and one or more external networks, such as the enterprise data network 150 of the enterprise domain 130.

In FIG. 1, at 102, the UE 110 attaches to the 5G network. In one deployment, the UE 110 latches onto the AN 122 and requests registration. The UE 110 then undergoes a primary authentication with the AUSF 121. The AMF 124 communicates with the SMF 126 to establish the PDU session for the UE 110. As part of establishing the PDU session, the SMF 126 checks the user profile, stored in a Unified Data Management (UDM) repository (not shown), to determine if the user is an enterprise user which is to be connected to an external data network (the enterprise data network 150) provided by the enterprise domain 130 of FIG. 1.

The enterprise domain 130 includes a data network (DN)—authentication, authorization, and accounting function (DN-AAA) 132 and another access network. In FIG. 1, the other access network is an enterprise WLAN network such as a Wi-Fi network. This is provided by way of an example only and not by way of a limitation. Another access network may include another cellular network, a private radio access network such as private 4G/LTE, private 5G, private CBRS, and/or combination of various access networks. Referring back to FIG. 1, the access network of the enterprise domain 130 includes a local AAA server (local AAA) 134, a controller 136 such as a WLAN controller (WLC), and an access point (AP) 138 such as a Wi-Fi AP.

As noted above, the SMF 126 determines whether a connection needs to be established with an external data network based on information in a user profile associated with a user of the UE 110. That is, the SMF 126 checks a subscription policy associated with the user that may indicate the user is to authenticate to an external data network in order to obtain access to certain services provided by the external data network. As such, the network may query the UE 110 for a secondary identity based on the subscription policy. The UE 110 may provide the secondary identity (e.g., lion@jungle.com) and the EAP transactions go through between the UE 110 and the DN-AAA 132, through the SMF 126 on the 5G network. After EAP-SUCCESS, the UE 100 has that he/she is the owner of the identity lion@jungle.com and has been authorized by the DN-AAA 132 into the jungle.com realm. In short, if the SMF 126 determines that a connection is to be established with an external data network and secondary authentication is enabled, such secondary authentication can be performed at 104, to authenticate the UE 110 to the external data network e.g., the enterprise network slice depicted as the enterprise data network 150.

According to one example embodiment, the trigger for the SMF 126 to initiate the secondary authentication can be based on a geographic location of the UE 110. That is, based on a detected location of the UE 110, the SMF 126 can determine the proximity of the UE 110 to the enterprise network. For example, the location of the UE 110 may be determined based on the cell to which the UE is attached. In other words, when the UE 110 completes the primary authentication to the first access network, the SMF 126, based on the subscription policy and based on the current location of the UE 110, can determines if a secondary authentication is to be performed for the UE for accessing the enterprise network. For example, a backend database (not shown) may be provided in at least one example embodiment, which may be configured with first information indicating the location of the access points of the enterprise network (e.g., Wi-Fi APs) and second information indicating the location of the access points (e.g., cellular APs) of the SP access network in which the first (location) information and the second (location) information can be correlated such that determining that the UE 110 is connected to an access point of the SP access network can be used to identify the location of the UE 110 as being proximate or not to the enterprise network (e.g., proximate to one or more access points of the enterprise network). In such an example embodiment, SMF 126 can determine based on subscription information of UE 110 and the location of UE 110 being proximate to the enterprise network to perform the secondary authentication.

According to one example embodiment, a subscription policy may include the following information:
  IMSI: XYX;
  #a: Secondary Authentication Required: Yes;
  #b: Secondary Network Domain/DNN Identity: @jungle.com;
  #c: Proximity Based Trigger: Yes.

Based on the subscription policy, the SMF 126 may determine whether or not to perform the secondary authentication. For example, if #a is present, the first access network may request that the UE 110 completes the secondary authentication. If #b is also specified, the UE 110 is expected to present an identity for that realm such as lion@jungle.com. Further, if #c is specified, a trigger for the secondary authentication may be suppressed based the location of the UE 110. For example, if the UE 110 is in a jungle in South America and the realm is in San Francisco, the trigger may be suppressed. In another example, location information can be provided that correlates the coverage area of one or more cellular APs of an SP network as overlapping one or more SSIDs associated with a Wi-Fi access network of an enterprise network. Other location-based information and/or determinations based on differing levels of location granularity can be envisioned.

Different EAP based authentication methods and associated credentials may be used. In one deployment, the SMF 126 is an EAP Authenticator, the UE 110 is the EAP Supplicant and the DN-AAA 132 is the authentication server. When the secondary authentication mode is enabled for the enterprise network slice, the 5G core network relies on the UN-AAA 132 to authenticate and authorize the request of the UE 110 for establishing the PDU session with the enterprise network slice, i.e., the enterprise data network 150.

In an example embodiment depicted in FIG. 1, the SMF 126 initiates EAP authentication and provides information about the UE 110 to the UPF 128. The UPF 128 forwards an EAP response/identity message to the DN-AAA 132 via an interface 106. The DN-AAA 132 communicates with the UE 110 via EAP messages to authenticate the UE 110 and also provides authentication information to the UE 110. The authentication information, by way of an example, may additionally include a data network (DN) identity, an identifier of the DN-AAA 132, and one or more enterprise keys. The UE 110 obtains access to the external data network (e.g., the enterprise data network 150) using provided authentication information and the DN-AAA 132 informs the SMF 126 of a successful secondary authentication via the interface 106 and the UPF 128. That is, the UE 110 attaches to the 5G network and performs secondary authentication (e.g., EAP authentication) with the DN-AAA 132 of the enterprise network via the interface 106 while establishing the PDU session. As part of this secondary authentication process, security information needed to access the enterprise data network 150 via another access network is generated and provided to the UE 110.

At 108, the UE 110 moves into a coverage area of another access network e.g., enterprise Wi-Fi of the enterprise domain 130. That is, the UE 110 roams into the network for which the UE 110 has already obtained the security authentication keys as part of the secondary authentication performed via the 5G network. According to an example embodiment, the UE 110 may fast roam into the enterprise data network 150 via the enterprise Wi-Fi network, as explained in greater detail with reference to operations 140-144 in FIG. 1.

Specifically, at 140, the UE 110 attaches to the AP 138 that indicates support for integration with the 5G network for fast roaming. In other words, the AP 138 indicates that fast roaming is available for the UE 110 instead of performing a full EAP authentication with the local AAA 134 i.e., a full EAP message exchange can be bypassed using techniques described herein.

At 142, based on receiving an indication (in a form a flag, for example) from the AP 138 that fast roaming is supported, the UE 110 provides secondary session information (5G EAP secondary authentication information). For example, the secondary session information may include a data network (DN) identity, a PDU session identifier, and an identifier of the DN-AAA 132 that performed the secondary authentication with the UE 110 via the interface 106. The secondary session information is forwarded to the controller 136 via the AP 138.

At 144, the controller 136 extracts the secondary session information obtained from the UE 110 and communicates with the DN-AAA 132 to obtain security information such as an enterprise key or a master session key (MSK) for the enterprise data network 150. Accordingly, fast roaming is performed and further EAP message exchanges are skipped. No authentication takes place with the local AAA 134. Based on the enterprise key, the UE 110 and the AP 138 proceeds with a four-way handshake skipping the remaining portion of the EAP authentication. The UE 110 is then connected to the enterprise data network 150 via the enterprise's Wi-Fi access network.

In one specific example, the MNO establishes a business relationship with an enterprise ABC.com. The MNO generates a network slice (slice Example.com) for the enterprise ABC.com. Secondary authentication is enabled on the slice Example.com and the DN-AAA 132 is the AAA server for the enterprise Example.com. The UE 110 of an employee A1 of the enterprise Example.com leaves for work. On his way to work, the employee A1 uses the UE 110 (a 5G enabled mobile device) to connect to the MNO network. The UE 110 attaches to the slice Example.com, completes the secondary authentication with the DN-AAA 132, and establishes an online meeting session. When the employee A1 reaches his office, enters the basement, and is in the vicinity of Example.com's Wi-Fi network, the UE 110 performs a fast roam to the Example.com's Wi-Fi network using the credentials generated as part of the secondary authentication performed on the slice Example.com. The online meeting session does not loose many packets because the handover is substantially faster. That is, the employee A1 is provided with fast access to the Example.com network via the Example.com's Wi-Fi network with only a few packets being dropped. In an example embodiment, fast roaming is enabled across an access network via standard interfaces without any requirements for new functions.

According to one example embodiment, the DN identity may be a unique identifier assigned to the enterprise data network 150 such that the UE 110 provides the DN identity with the established session identifier so that a corresponding enterprise key is retrieved. The enterprise key is applicable to various access networks of the enterprise network 150.

Figure 2A:
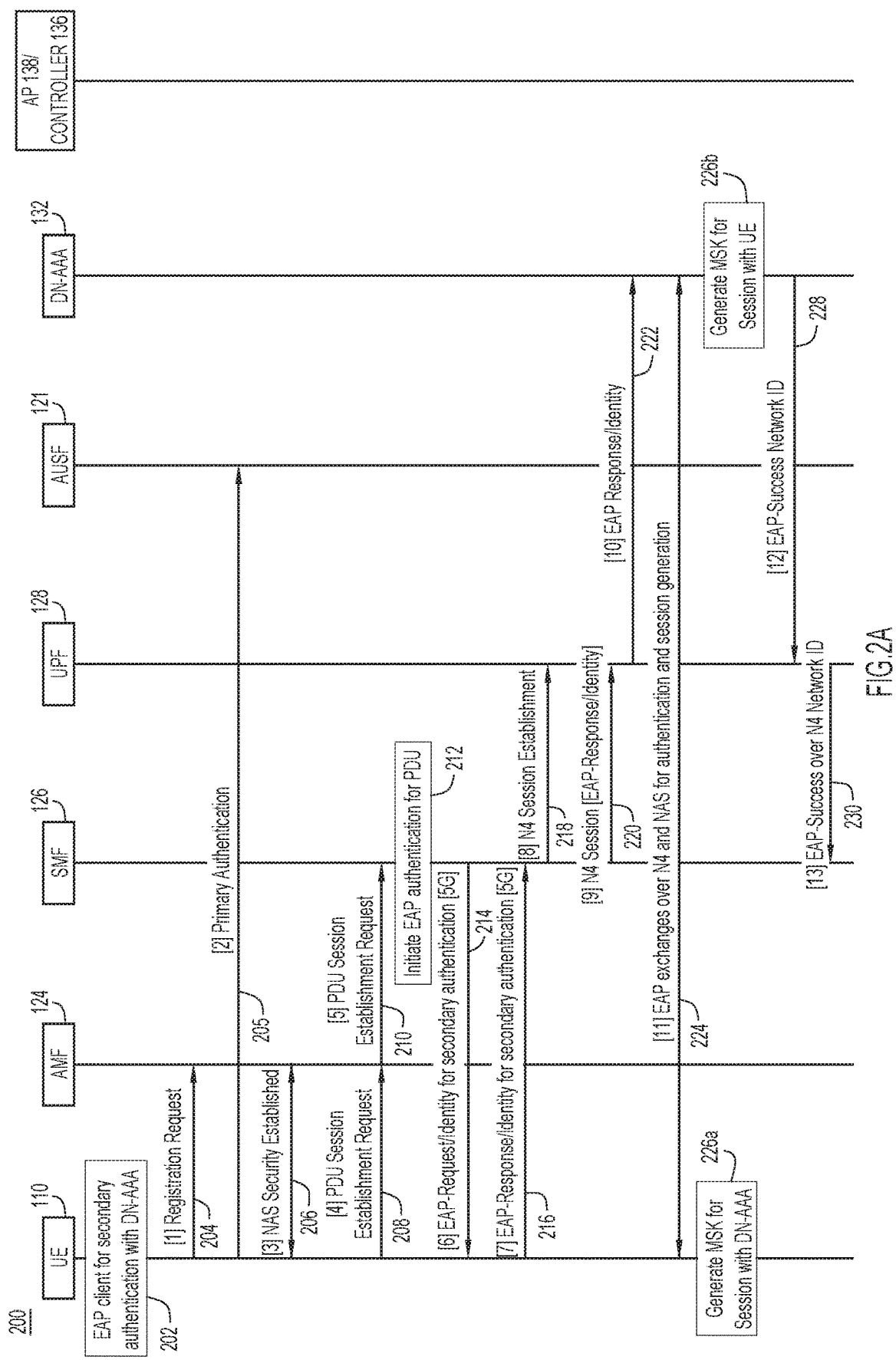
FIGS. 2A and 2B are sequence diagrams illustrating a method of extending fast roaming to an enterprise network via a second access network based on a secondary authentication in a first access network, according to an example embodiment.
Figure 2B:
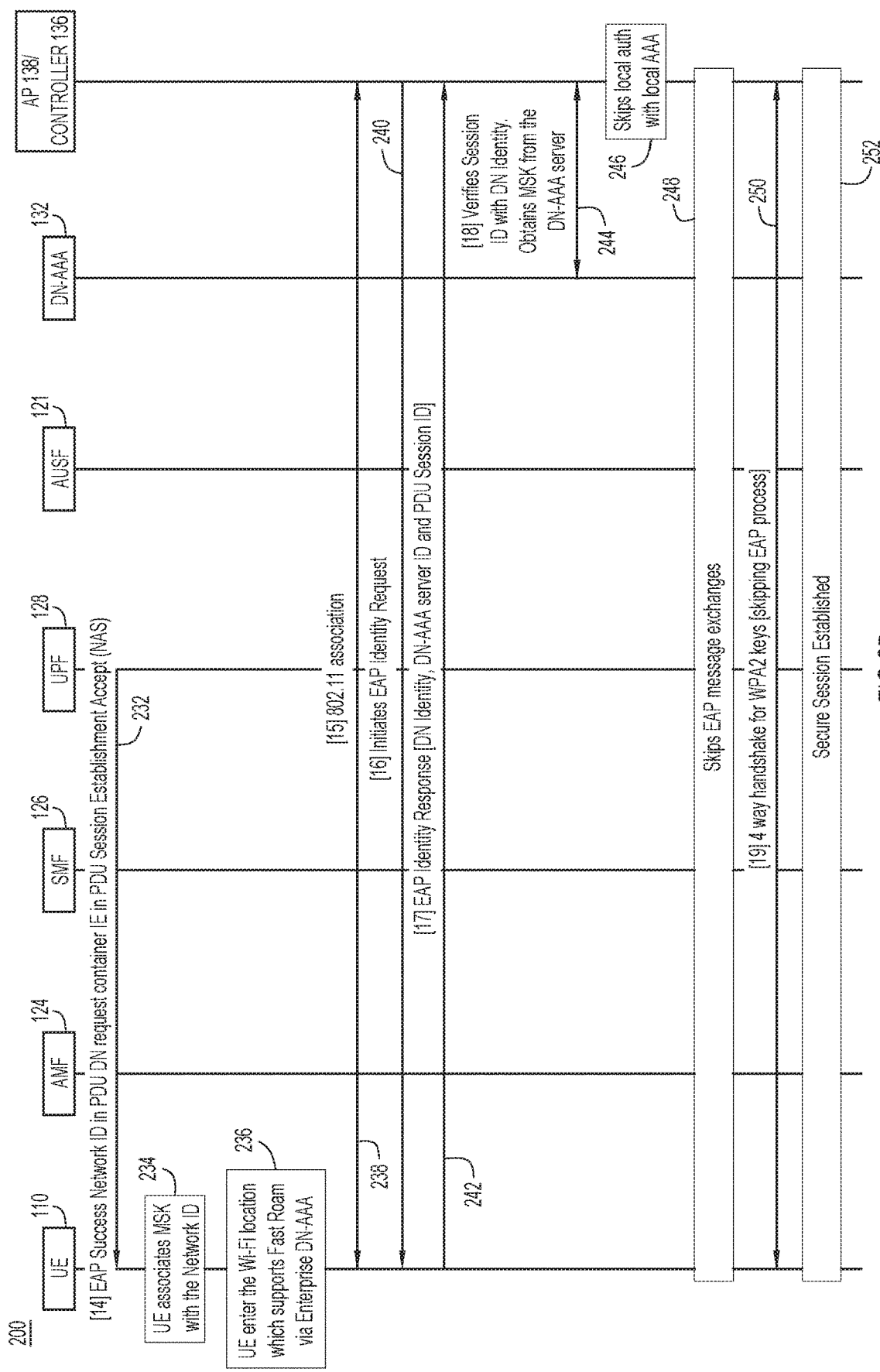

FIGS. 2A and 2B are sequence diagrams illustrating a method 200 of extending fast roaming to an enterprise network via a second access network based on a secondary authentication of a UE performed via a first access network, according to an example embodiment. In an example embodiment of FIGS. 2A and 2B, the fast roaming is enabled from a 5G cellular network to an enterprise Wi-Fi network.

The method 200 involves the UE 110, the service provider domain 120 including the AUSF 121, the AMF 124, the SMF 126, and the UPF 128, and the enterprise domain 130 including DN-AAA 132 and the AP 138 or the WLC (referred to as the controller 136), described above with reference to FIG. 1.

In FIG. 2A, at 202, the UE 110 is an EAP client that is associated with an enterprise domain and that uses a secondary authentication with the DN-AAA 132 to access the enterprise network.

At 204, the UE 110 transmits a registration request to the AMF 124 to attach to the 5G cellular network. The UE 110 requests connectivity with the 5G network to attach to a slice of an enterprise network (obtain enterprise services). At 205, the UE 110 communicates with the AUSF 121 for a primary authentication. That is, the UE provides its network access credentials to the AUSF 121 for authentication.

At 206, based on the UE 110 being primary authenticated, the UE 110 establishes a non-access stratum (NAS) security context with the AMF 124.

At 208, the UE 110 transmits a PDU session establishment request to the AMF 124.

At 210, the AMF 124 forwards the PDU session establishment request to the SMF 126. The SMF 126 determines that the UE 110 is an EAP client that is associated with an enterprise domain. The SMF 126 may look into a local record to determine whether secondary authentication is required. According to yet another example embodiment, the SMF 126 may extract client identification information provided in the request and obtain a corresponding user profile associated with the UE 110 from a storage repository. Based on the obtained user profile, the SMF 126 may determine that secondary authentication is needed. The SMF 126 checks whether the request from the UE 110 is compliant with the information in the user profile and with local policies. Although not illustrated in FIG. 2A, in some embodiments, SMF 126 may determine whether secondary authentication is to be utilized based additionally on location information for the UE 110.

At 212, the SMF 126 initiates the EAP authentication (secondary authentication) for the PDU session being established. Specifically, at 214, the SMF 126 transmits an EAP request (an identity message) for the secondary authentication in a 5G network, to the UE 110. The request is for credential for the secondary authentication. At 216, the UE 110 provides its credentials to the SMF 126 in a form of an EAP response (identity response message) for the secondary authentication in the 5G network. The credentials may include a data network specific identity (DN identity). The DN identity can be in a realm such as Example.com. This can be derived from a Network Access Identifier (NAI) (e.g., user@example.com). The credentials identify the user with respect to the enterprise network or serve as an enterprise identity for the UE 110.

At 218, the SMF 126 selects the UPF 128 and establishes an N4 session. At 220, the SMF 126 forwards the EAP response (the identity response message) to the UPF 128.

At 222, based on the information in the EAP response, the UPF 128 identifies the DN-AAA 132 and forwards the response to the DN-AAA 132.

At 224, the DN-AAA 132 exchange EAP messages with the UE 110, via N4 and Non Access Stratum (NAS) communications for authentication and session key generation.

At 226a, the UE 110 generates security information such as MSK or an enterprise key for the session with the DN-AAA 132 and at 226b, the DN-AAA 132 also generates security information such as the MSK or the enterprise key for the session with the UE 110. According to one or more example embodiments, the security information is associated with various access networks of the enterprise to enable fast roaming into the enterprise network from various access networks. The generated security information is respectively stored at the UE 110 and the DN-AAA 132. The DN-AAA 132 stores the generated security information in association with the PDU session identifier assigned by the DN-AAA 132 for the session being established during the secondary authentication.

At 228, the DN-AAA 132 transmits, to the UPF 128, an EAP success notification (success message) indicating that the secondary authentication was completed successfully. The notification includes a network identifier (network ID).

At 230, the UPF 128 forwards the EAP success notification to the SMF 126. The SMF 126 may store the enterprise network specific identifier and an identifier of the DN-AAA 132 in a list locally or may update the list in a UMD repository (not shown).

Referring to FIG. 2B, at 232, the SMF 126 transmits an EAP success notification to the UE 110. The EAP success notification may include one or more network identifiers for one or more access networks of the enterprise network (network IDs) and a PDU session identifier (ID) for the UE session. For example, the EAP success notification may include a network identifier such as Service Set Identifier (SSID) for the enterprise's Wi-Fi network. The EAP success notification may be provided in the PDU session establishment accept message sent to the UE 110 via the AN 122.

At 234, the UE 110 stores the generated security information such as the MSK in association with one or more network identifiers for various access networks of the enterprise and in association with the PDU session ID. For example, the UE 110 stores the SSID for the enterprise's Wi-Fi network in association with the MSK generated by the UE 110 at 226a and in association with the PDU session ID obtained at 232.

At 236, the UE 110 enters an area that is covered by one or more other access networks of the enterprise network e.g., the enterprise's Wi-Fi network. The enterprise's Wi-Fi network supports fast roaming via the DN-AAA 132.

At 238, the UE 110 attaches to the AP 138, for example using IEEE 802.11 protocol for the association process i.e., primary authentication.

At 240, the AP 138 transmits an EAP identity request for the secondary authentication with the enterprise's Wi-Fi network.

At 242, the UE 110 transmits, to the AP 138, an EAP identity response which includes information that facilitates fast roaming to the enterprise's Wi-Fi network. That is, the EAP identity response includes a DN identifier, an identifier of the DN-AAA 132, and the PDU session ID.

Based on the EAP identity response including the identifier of the DN-AAA 132, the AP 138 (for example, via the controller 136 shown in FIG. 1) locates the DN-AAA 132. At 244, the AP 138 (via the controller 136) queries the DN-AAA 132 for the security information (the enterprise key). It is to be understood that various operations involving AP 138 may include any combination of functionality that may be facilitated via AP 138 and/or controller 136, which can be referred to herein using the term AP 138/controller 136 or, more generally, the term 'network device'. That is, the AP 138/controller 136 extracts identifiers from the EAP identity response and verifies the UE 110 by communicating with the DN-AAA 132. In particular, the AP 138/controller 136 transmits a session identifier (the PDU session ID) and the DN identity to the DN-AAA 132. If a record exists in the DN-AAA 132 corresponding to the session identifier and the DN identifier, the DN-AAA 132 transmits the enterprise key (generated at 226b) to the AP 138/controller 136.

In an alternative example embodiment, the AP 138/controller 136 may receive from the UE 110 the EAP identity response that does not include an identifier of the DN-AAA 132. As noted above, based on the EAP identity response including a PDU session ID, the AP 138/controller 136 may query its internal list for an identifier of the DN-AAA 132 or may query the UMD repository for the identifier of the DN-AAA 132. That is, the AP 138/controller 136 may determine the identifier of the DN-AAA 132 based on pre-stored information. According to yet another example embodiment, the DN-AAA 132 may be distributed so that multiple DN-AAAs are provided in the enterprise network. In this case, the AP 138/controller 136 may determine a location of the UE 110 and based on the location of the UE 110, select one of the DN-AAAs to communicate with, at 244.

At 246, the AP 138/controller 136 may now skip local authentication with a local AAA 134 because it has obtained the security information for the established the session with the enterprise network for the UE 110.

At 248, the AP 138/controller 136 may now skip performing EAP message exchanges in which new security information (e.g., key(s)) is generated.

At 250, the AP 138/controller 136 proceed with a 4-way handshake with the UE 110 for a Wi-Fi Protection Access (WPA) 2 keys. The remaining portion of the EAP process is skipped, as noted above.

At 252, the UE 110 establishes a new secure session (e.g., Wi-Fi session) with the enterprise network via the enterprise's Wi-Fi network using the AP 138.

While above example embodiment describes the secondary authentication using the EAP, this is not limiting and the secondary authentication may be performed using other known techniques in which an enterprise key is generated during the secondary authentication process to be used to fast roam to the enterprise network via another access network. For example, the secondary authentication may be performed using Authentication and Key Agreement (AKA) protocol. In this case, the enterprise key is a Key Access Security Management Entity key (KASME or $K_{ASME}$) that is generated during the AKA authentication process.

Example embodiments provide for generating an enterprise key needed for access to an enterprise network via a private radio access network of an enterprise, where the enterprise key is generated as part of a secondary authentication for the enterprise network through a cellular network such as MNO's network. Example embodiments further provide for fast roaming into an enterprise data network from another access network using the generated enterprise key. That is, the DN-AAA 132 provides a network identifier such as the enterprise Wi-Fi SSID to the UE 110 over the MNO's cellular network authentication interfaces. The enterprise key is then used to access the Wi-Fi network identified by the network identifier. For example, the DN-AAA 132 uses the data network identity, the PDU session identifier as means to correlate the UE 110 to an already authenticated session.

As noted above, in some deployments, the DN-AAA 132 may be distributed and include a number of DN-AAAs. When there is no single DN-AAA server farm with synchronized states, techniques are provided for ensuring both the authentication flows land on the same AAA server from among multiple DN-AAAs. In one example deployment, the AP 138 may obtain an identity of an AAA server from the UE 110. In another example deployment, the AP 138 may use a geographic location of the UE 110 to determine the AAA server from among multiple DN-AAAs.

In some example deployments, the AP 138 may be configured to automatically check the DN-AAA 132 for an existing PDU session based on the identity of the UE 110.

In addition, although examples herein discuss that a primary access network may be operated by a service provider and a secondary access network may be operated by an enterprise, in some embodiments, the secondary access network may be an access network operated by any of an enterprise, a service provider (e.g., a same or different service provider as may be operating the primary access network).

Accordingly, at least a portion of secondary authentication may be skipped when access network for the enterprise data network changes. For example, EAP exchanges following identity request and response may be skipped as a result of a prior-authenticated session identification.

According to yet another example embodiment, the AP 138 may be configured to indicate fast roaming capability to the UE 110. That is, the AP 138 may indicate that it supports fast roaming support through MNO's backend integration. The AP 138 may include an indicator that fast roaming is supported in a beacon message or in a probe response of a Wi-Fi access network.

Although above example embodiments are explained with respect to the AP 138, this is not limiting. Any enterprise authentication elements or entities may communicate with the DN-AAA 132 to obtain the enterprise key when the UE 110 provides correlation identities of an access network with a PDU session.

Figure 3:
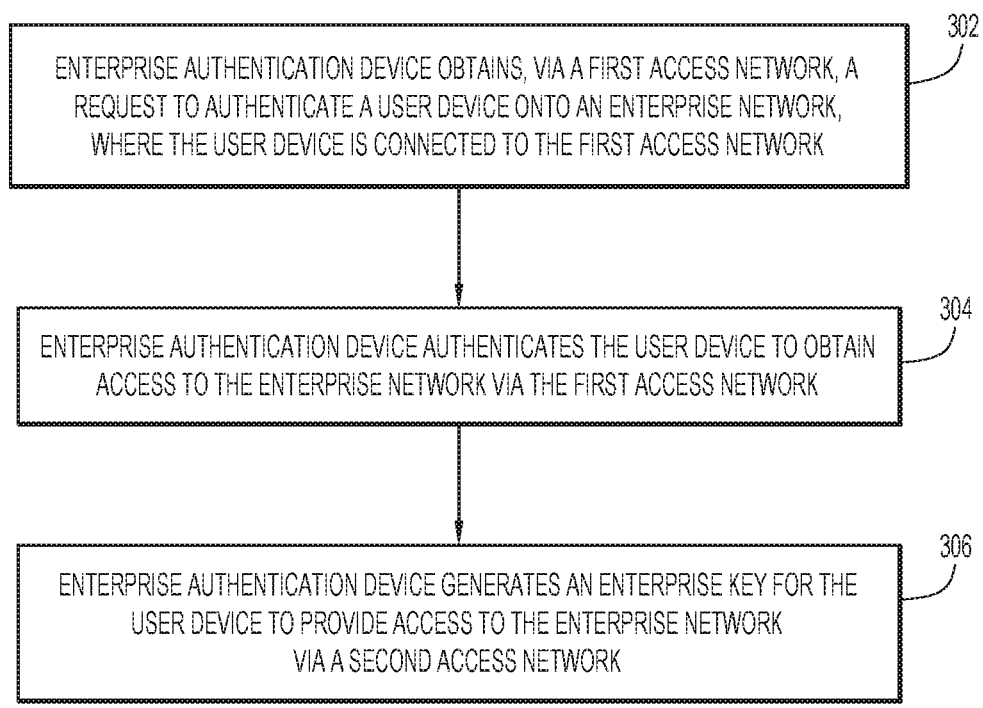
FIG. 3 is a flowchart illustrating a method of generating an enterprise key to enable fast roaming to an enterprise network via another access network, according to an example embodiment.

FIG. 3 is a flowchart illustrating a method 300 of generating an enterprise key to enable fast roaming to an enterprise network via another access network, according to an example embodiment. The method 300 is performed by an enterprise authentication device such as the DN-AAA 132 depicted in FIGS. 1 and 2.

At 302, the enterprise authentication device obtains, via a first access network, a request to authenticate a user device onto an enterprise network. The user device is connected to the first access network.

At 304, the enterprise authentication device authenticates the user device to obtain access to the enterprise network via the first access network.

At 306, the enterprise authentication device generates an enterprise key for the user device to provide access to the enterprise network via a second access network.

In one form, the method 300 may further include the enterprise authentication device associating an identifier of the second access network with the enterprise key and providing, to the user device, via the first access network, a notification indicating that the user device is authenticated to access the enterprise network. The notification includes the identifier of the second access network.

According to one or more example embodiments, the method 300 may further include the enterprise authentication device determining that the user device is attempting access to the enterprise network via the second access network and the enterprise authentication device verifying that the user device is authenticated to access the enterprise network. The method 300 may further include the enterprise authentication device providing, to an access point of the second access network, the enterprise key based on verifying that the user device is authenticated to access the enterprise network.

According to one or more example embodiments, the verifying operation may include the enterprise authentication device verifying that the user device has an authenticated session with the enterprise network via the first access network based on a session identifier of the authenticated session and a identifier of the second access network, obtained from the user device.

According to one or more example embodiments, the obtaining operation 302 may be based on determining that an authentication with the enterprise network is enabled using at least one of a subscription profile of a user associated with the user device and a location of the user device.

According to one or more example embodiments, the first access network is a cellular access network and the second access network is a wireless local access network. As noted previously, although examples herein discuss that a primary access network may be operated by a service provider and a secondary access network may be operated by an enterprise, in some embodiments, the secondary access network may be an access network that may be operated by any of an enterprise, a service provider (e.g., a same or different service provider as may be operating the primary access network).

In one form, the authenticating operation 304 may include the enterprise authentication device performing an extensible authentication protocol (EAP) authentication where the enterprise key is an EAP Master Session key or performing authentication and key agreement (AKA) authentication where the enterprise key is a key access security management entities key.

FIG. 4 is a flowchart illustrating a method 400 of fast roaming into an enterprise network via another access network based on an enterprise key, according to an example embodiment. The method 400 is performed by a network device. The network device may include any combination of functionality as may be provided by an access point such as the AP 138 depicted in FIGS. 1 and 2 and/or the controller 136 (WLC), depicted in FIGS. 1 and 2.

At 402, the network device obtains, via a first access network, a request to authenticate a user device to establish another session with an enterprise network. The request includes an identifier of an enterprise authentication device that stores an enterprise key for an established session of the user device with the enterprise network provided via a second access network, and an identifier of the established session.

At 404, the network device obtains, from the enterprise authentication device, the enterprise key based on the enterprise authentication device correlating an identity of the first access network with an identifier of the established session with the enterprise network via the second access network.

At 406, the network device establishes, via the first access network, the another session with the enterprise network based on the enterprise key.

According to one or more example embodiments, the method 400 further includes the network device skipping further authentication of the user device based on obtaining the enterprise key.

In one form, the method 400 further includes the network device providing, to the user device, an indicator indicating that fast roaming into the enterprise network via the first access network is available.

According to one or more example embodiments, the method 400 further includes the network device selecting the enterprise authentication device from among a plurality of enterprise authentication devices based on a location of the user device and obtaining, from the enterprise authentication device, the enterprise key, to establish the another session with the enterprise network via the first access network instead of the established session via the second access network.

According to one or more example embodiments, the first access network is a wireless local access network operated by an enterprise entity and wherein the second access network is a cellular network operated by a service provider.

In one form, the second access network is a $4^{th}$ generation or a $5^{th}$ generation cellular access network and the first access network is a private radio access network.

According to one or more example embodiments, the method 400 further includes the network device authenticating, the user device, based on the enterprise key. The request is an extensible authentication protocol (EAP) identity response and the enterprise key is an EAP Master Session key. The method 400 further includes the network device skipping a remaining portion of an EAP authentication message exchange and performing a four-way handshake with the user device.

FIG. 5 is a hardware block diagram of a computing device 500 configured to provide fast roaming between different access technologies, according to various example embodiments. The computing device 500 is generally representative of an enterprise authentication device such as the DN-AAA 132 shown in FIGS. 1 and 2. The computing device 500 performs the functions of the DN-AAA 132 that performs the operations described herein in connection with FIGS. 1-3. In another example embodiment, the computer device 500 is a network device such as the AP 138 or the controller 136 shown in FIGS. 1 and 2. In this case, the computing device 500 performs the function of the AP 138/controller 136 that performs the operations described herein in connection with FIGS. 1, 2, and 4.

It should be appreciated that FIG. 5 provides only an illustration of various embodiments and does not imply any limitations with regard to the environments in which different embodiments may be implemented. Many modifications to the depicted environment may be made. The methods explained above may be executed by one or more processors of a servicer and/or a network equipment.

As depicted, the computing device 500 includes a bus 512, which provides communications between computer processor(s) 514, a memory 516, a persistent storage 518, communications unit 520, and input/output (I/O) interface(s) 522. The bus 512 can be implemented with any architecture designed for passing data and/or control information between processors (such as microprocessors, communications and network processors, etc.), system memory, peripheral devices, and any other hardware components within a system. For example, the bus 512 can be implemented with one or more buses.

The memory 516 and persistent storage 518 are computer readable storage media. In the depicted embodiment, the memory 516 includes a random access memory (RAM) 524 and a cache (cache memory) 526. In general, the memory 516 can include any suitable volatile or non-volatile computer readable storage media that stores instructions for the control logic 525.

The control logic 525 includes instructions that, when executed by the computer processor(s) 514, cause the computing device 500 to perform one or more of the methods described herein including a method of generating an enterprise key, as part of a secondary authentication via a first access network, the enterprise key is for the user device to obtain access to the enterprise network via a second access network, and including The one or more methods described herein further include a method of fast roaming into an enterprise network via an access network based on the enterprise key generated during secondary authentication to the enterprise network via another access network. The control logic 525 may be stored in the memory 516 or the persistent storage 518 for execution by the computer processor(s) 514.

One or more programs may be stored in persistent storage 518 for execution by one or more of the respective computer processor(s) 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions, computer executable instructions, or digital information.

The media used by the persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

The communications unit 520, in these examples, provides for communications with other data processing systems or devices. In these examples, communications unit 520 includes one or more network interface cards. Communications unit 520 may provide communications through the use of either or both physical (wired) and wireless communications links.

The I/O interface(s) 522 allows for input and output of data with other devices that may be connected to the computing device 500. For example, the I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. The display 530 provides a mechanism to display data to a user and may be, for example, a computer monitor.

In still another example embodiment, an apparatus is provided. The apparatus may be an enterprise authentication device such as the DN-AAA 132 of FIGS. 1-3 or an access point such as the AP 138 of FIGS. 1, 2, and 4.

In case the apparatus is an enterprise authentication device, the apparatus includes a communication interface configured to enable network communications, a memory configured to store executable instructions, and a processor coupled to the communication interface and the memory.

The processor is configured to perform operations that include obtaining, via a first access network, a request to authenticate a user device onto an enterprise network. The user device is connected to the first access network. The operations further include authenticating the user device to obtain access to the enterprise network via the first access network and generating an enterprise key for the user device to provide access to the enterprise network via a second access network.

In one form, the processor may further be configured to perform operations including associating an identifier of the second access network with the enterprise key and providing, to the user device, via the first access network, a notification indicating that the user device is authenticated to access the enterprise network, wherein the notification includes the identifier of the second access network.

According to one or more example embodiments, the processor may further be configured to perform operations including determining that the user device is attempting access to the enterprise network via the second access network, verifying that the user device is authenticated to access the enterprise network and providing, to an access point/controller of the second access network, the enterprise key based on verifying that the user device is authenticated to access the enterprise network.

According to one or more example embodiments, the processor may perform verifying that the user device is authenticated to access the enterprise network by verifying that the user device has an authenticated session with the enterprise network via the first access network based on a session identifier of the authenticated session and an identifier of the second access network, obtained from the user device.

According to one or more example embodiments, the first access network is a cellular access network operated by a service provider and wherein the second access network is a wireless local access network operated by an enterprise entity. According to one or more example embodiments, the first access network is a cellular access network and wherein the second access network is a wireless local access network.

According to one or more example embodiments, the processor may perform authenticating of the user device by one of performing an extensible authentication protocol (EAP) authentication, wherein the enterprise key is an EAP Master Session key or performing authentication and key agreement (AKA) authentication, wherein the enterprise key is a key access security management entities key.

In case the apparatus is an access point/controller (e.g., network device), the apparatus includes a communication interface configured to enable network communications, a memory configured to store executable instructions, and a processor coupled to the communication interface and the memory. The processor is configured to perform operations that include obtaining, via a first access network, a request to authenticate a user device to establish another session with an enterprise network. The request includes an identifier of an enterprise authentication device that stores an enterprise key for an established session of the user device with the enterprise network provided via a second access network. The operations further include obtaining, from the enterprise authentication device, the enterprise key based on the enterprise authentication device correlating an identity of the first access network with an identifier of the established session with the enterprise network via the second access network and establishing, via the first access network, the another session with the enterprise network based on the enterprise key.

In yet other example embodiments, one or more non-transitory computer readable storage media encoded with instructions are provided. When the media is executed by the processor, the instructions cause the processor to perform any of the operations described above with reference to FIGS. 3 and 4. That is, the methods of FIGS. 3 and 4 can be embodied on the one or more non-transitory computer readable storage media.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, an apparatus, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, by an enterprise authentication device, via a first access network, a request to authenticate a user device onto an enterprise network that is a private data network, wherein the user device is connected to the first access network by performing a primary authentication;
determining, based on the performing the primary authentication, whether to connect the user device to the enterprise network, wherein the determining is further based on a subscription policy of the user device that includes information indicating that a secondary authentication is to be made to connect the user device to the enterprise network, a current location of the user device, and an identity of the enterprise network;
in response to the determining, authenticating the user device to connect the user device with the enterprise network via the first access network by having the enterprise authentication device perform the secondary authentication;
generating, by the enterprise authentication device, an enterprise key that enables the user device to access the enterprise network using a second access network that is different from the first access network and requires a separate primary authentication;
providing, to the user device, the enterprise key for accessing the enterprise network via the second access network, wherein the enterprise key is a master session key generated while performing an extensible authentication protocol (EAP) or an authentication and key agreement authentication (AKA) to authenticate the user device to access the enterprise network via the first access network; and
establishing a connection between the user device and the enterprise network via the second access network instead of the first access network by using the enterprise key and skipping at least a portion of the EAP or the AKA for authenticating the user device to access the enterprise network via the second access network.

2. The method of claim 1, further comprising:
associating, by the enterprise authentication device, an identifier of the second access network with the enterprise key; and
providing, by the enterprise authentication device to the user device, via the first access network, a notification indicating that the user device is authenticated to access the enterprise network, wherein the notification includes the identifier of the second access network.

3. The method of claim 1, further comprising:
determining, by the enterprise authentication device, that the user device is attempting access to the enterprise network via the second access network;
verifying, by the enterprise authentication device, that the user device is authenticated to access the enterprise network; and
providing, by the enterprise authentication device to an access point of the second access network, the enterprise key based on verifying that the user device is authenticated to access the enterprise network via the first access network.

4. The method of claim 3, wherein the verifying that the user device is authenticated to access the enterprise network further includes:
verifying, by the enterprise authentication device, that the user device has an authenticated session with the enterprise network via the first access network based on a session identifier of the authenticated session and an identifier of the second access network, obtained from the user device.

5. The method of claim 1, wherein the first access network is a cellular access network and the second access network is a wireless local access network.

6. The method of claim 1, wherein the enterprise key is an EAP Master Session key or a Key Access Security Management Entity key.

7. The method of claim 1, further comprising:
connecting the user device with the enterprise network via the first access network based on the user device being authenticated by the enterprise authentication device.

8. The method of claim 1, wherein the enterprise key is also generated and stored at the user device, wherein the enterprise key is associated with a communication session identifier generated during the secondary authentication.

9. A method comprising:
obtaining, by a network device, via a first access network, a request to authenticate a user device to establish another session with an enterprise network, the request including an identifier of an enterprise authentication device, wherein the enterprise authentication device stores an enterprise key for an established session of the user device with the enterprise network and wherein the established session is provided to the user device via a second access network;
obtaining, by the network device from the enterprise authentication device, the enterprise key based on the enterprise authentication device correlating an identity of the first access network with an identifier of the established session of the user device with the enterprise network via the second access network;
establishing, by the network device, the another session with the enterprise network based on the enterprise key, via the first access network, provided by a first service provider, that is configured to connect the user device to a communication network based on the user device performing a first primary authentication and further based on determining whether to connect the user device to the enterprise network based on a subscription policy that includes information indicating that a secondary authentication is to be made to connect the user device to the enterprise network, a current location of the user device, and an identity of the enterprise network, wherein:
the second access network, provided by a second service provider different than the first service provider, is configured to connect the user device to the communication network based on the user device performing a second primary authentication different from the first primary authentication,
the enterprise network is a private data network that involves the secondary authentication with the enterprise authentication device and a connection with the communication network, and
the enterprise key is a master session key generated while performing an extensible authentication protocol (EAP) or an authentication and key agreement authentication (AKA) to authenticate the user device to access the enterprise network via the first access network; and
skipping, by the network device, at least a portion of the EAP or the AKA for authenticating the user device to access the enterprise network via the first access network for establishing a connection to the enterprise network via the first access network, based on obtaining the enterprise key.

10. The method of claim 9, further comprising:
providing, by the network device to the user device, an indicator indicating that fast roaming into the enterprise network via the first access network is available.

11. The method of claim 9, further comprising:
selecting, by the network device, the enterprise authentication device from among a plurality of enterprise authentication devices based on a location of the user device; and
obtaining, by the network device from the enterprise authentication device, the enterprise key, to establish the another session with the enterprise network via the first access network instead of the established session via the second access network.

12. The method of claim 9, wherein the first access network is a wireless local access network operated by an enterprise entity and wherein the second access network is a cellular network operated by a service provider.

13. The method of claim 9, wherein the second access network is a $4^{th}$ generation or a $5^{th}$ generation cellular access network and the first access network is a private radio access network.

14. The method of claim 9, wherein the enterprise key is an EAP Master Session key or a Key Access Security Management Entity key and further comprising:
performing, by the network device, a four-way handshake with the user device.

15. The method of claim 9, wherein the enterprise key is generated during an authentication process with the enterprise authentication device for the established session of the user device with the enterprise network via the second access network.

16. An apparatus comprising:
a communication interface configured to enable network communications on a mobile network;
a memory configured to store executable instructions; and
a processor coupled to the communication interface and the memory and configured to perform operations including:
obtaining, via a first access network, a request to authenticate a user device onto an enterprise network that is a private data network, wherein the user device is connected to the first access network by performing a primary authentication;
determining, based on the performing the primary authentication, whether to connect the user device to the enterprise network, wherein the determining is further based on a subscription policy of the user device that includes information indicating that a secondary authentication is to be made to connect the user device to the enterprise network, a current location of the user device, and an identity of the enterprise network;
in response to the determining, authenticating the user device to connect the user device with the enterprise network via the first access network by performing the secondary authentication;

generating an enterprise key for the user device that enables the user device to access the enterprise network using a second access network that is different from the first access network and requires a separate primary authentication;

providing, to the user device, the enterprise key for accessing the enterprise network via the second access network, wherein the enterprise key is a master session key generated while performing an extensible authentication protocol (EAP) or an authentication and key agreement authentication (AKA) to authenticate the user device to access the enterprise network via the first access network; and establishing a connection between the user device and the enterprise network via the second access network instead of the first access network by using the enterprise key and skipping at least a portion of the EAP or the AKA for authenticating the user device to access the enterprise network via the second access network.

17. The apparatus of claim 16, wherein the processor is further configured to perform the operations including:

associating an identifier of the second access network with the enterprise key; and providing, to the user device, via the first access network, a notification indicating that the user device is authenticated to access the enterprise network, wherein the notification includes the identifier of the second access network.

18. The apparatus of claim 16, wherein the processor is further configured to perform the operations including:

determining that the user device is attempting access to the enterprise network via the second access network;

verifying that the user device is authenticated to access the enterprise network; and providing, to an access point of the second access network, the enterprise key based on verifying that the user device is authenticated to access the enterprise network.

19. The apparatus of claim 18, wherein the processor performs verifying that the user device is authenticated to access the enterprise network by:

verifying that the user device has an authenticated session with the enterprise network via the first access network based on a session identifier of the authenticated session and an identifier of the second access network, obtained from the user device.

20. The apparatus of claim 16, wherein the first access network is a cellular access network operated by a service provider and wherein the second access network is a wireless local access network operated by an enterprise entity.

21. The apparatus of claim 16, wherein the enterprise key is an EAP Master Session key or a key access security management entities key.

22. The apparatus of claim 16, wherein the enterprise key is also generated and stored at the user device, wherein the enterprise key is associated with a communication session identifier generated during the secondary authentication.

23. The apparatus of claim 16, wherein the processor is further configured to perform the operations including:

connecting the user device with the enterprise network via the first access network based on the user device being authenticated.

\* \* \* \* \*